United States Patent
Lee et al.

(10) Patent No.: US 9,360,081 B2
(45) Date of Patent: Jun. 7, 2016

(54) TORSIONAL VIBRATION DAMPER FOR HYDROKINETIC TORQUE COUPLING DEVICE

(71) Applicant: VALEO EMBRAYAGES, Amiens (FR)

(72) Inventors: Sungchul Lee, Troy, MI (US); Rabah Arhab, Saint Brice Sous Foret (FR)

(73) Assignee: Valeo Embrayages (FR)

( * ) Notice: Subject to any disclaimer, the term of this patent is extended or adjusted under 35 U.S.C. 154(b) by 18 days.

(21) Appl. No.: 14/305,128

(22) Filed: Jun. 16, 2014

(65) Prior Publication Data

US 2015/0362041 A1 Dec. 17, 2015

(51) Int. Cl.
*F16F 15/134* (2006.01)
*F16H 45/02* (2006.01)

(52) U.S. Cl.
CPC ....... *F16F 15/1343* (2013.01); *F16F 15/13492* (2013.01); *F16H 45/02* (2013.01); *F16H 2045/0221* (2013.01); *F16H 2045/0263* (2013.01)

(58) Field of Classification Search
CPC .............................................. F16H 2045/0221
USPC ....................................................... 192/3.28
See application file for complete search history.

(56) References Cited

U.S. PATENT DOCUMENTS

| 4,976,656 A * | 12/1990 | Bacher .................... F16F 15/12 |
|   |   | 192/213.31 |
| 8,403,762 B2 | 3/2013 | Steinberger |
| 9,051,977 B2 * | 6/2015 | Kawahara ............... F16H 45/02 |
| 2010/0269497 A1 | 10/2010 | Engelmann et al. |
| 2011/0099992 A1 | 5/2011 | Magerkurth et al. |
| 2012/0080281 A1 | 4/2012 | Takikawa et al. |
| 2012/0305358 A1 * | 12/2012 | Maienschein ......... F16F 15/145 |
|   |   | 192/3.28 |
| 2013/0305876 A1 | 11/2013 | Schnaedelbach et al. |

FOREIGN PATENT DOCUMENTS

FR 2976641 12/2012
WO WO/2012/172225 12/2012

* cited by examiner

*Primary Examiner* — Mark Manley
(74) *Attorney, Agent, or Firm* — Berenato & White, LLC

(57) ABSTRACT

A torsional vibration damper of a hydrokinetic torque coupling device, comprises a driven plate rotatable about a rotation axis, an intermediate plate rotatably mounted about the driven plate coaxially with the rotation axis, a back plate rotatably mounted about the intermediate plate coaxially with the rotation axis, a plurality of circumferentially acting elastic members interposed between the driven plate and the intermediate plate, and a damper retainer plate non-moveably secured to the back plate coaxially with the rotation axis. The damper retainer plate is operatively connected to the elastic members. The driven plate, the intermediate plate and the back plate are aligned with each other along a radial axis perpendicular to said rotation axis.

23 Claims, 11 Drawing Sheets

TORSIONAL VIBRATION DAMPER FOR HYDROKINETIC TORQUE COUPLING DEVICE

BACKGROUND OF THE INVENTION

1. Field of the Invention

The present invention generally relates to hydrokinetic torque coupling devices, and more particularly to a hydrokinetic torque coupling device with a torsional vibration damper.

2. Description of the Prior Art

An internal combustion engine exhibits irregularities due to the succession of combustion events in the engine cylinders. Torsion damping devices allow these irregularities to be filtered before the drive torque is transmitted to an automotive transmission. This is because the vibrations must be damped before they enter the transmission and produce unacceptably troublesome noise. To accomplish this, it is known to interpose a torsion damping device between a drive shaft and a transmission (or driven) shaft. The torsion damping device is generally arranged in a hydrokinetic torque coupling device that allows temporary rotational connection of the drive shaft to the transmission shaft.

Typically, a hydrokinetic torque coupling device includes a hydrodynamic torque converter and a torsion damping device positioned between an axially oriented coaxial drive shaft and driven shaft of the automotive transmission. The torsion damping device includes a torque input element and a torque output element, and circumferentially acting elastic members. The circumferentially acting elastic members are interposed between the torque input element and the torque output element. In so-called "long travel" damping devices, the elastic members are mounted, in groups of at least two elastic members, in series between the input element and output element.

A torque converter of this kind typically has a rotating casing that is capable of transmitting drive torque to the damping device by means of a friction locking clutch, traditionally called a lock-up clutch. The torque converter also has a turbine wheel mounted rotatably inside the casing.

For some applications, the torsion damping device may also include a pendulum oscillator conventionally utilized both in friction clutches and in motor vehicle hydrokinetic coupling apparatuses. A pendulum oscillator has at least one pendulum mass or flyweight, generally several, that is arranged around the rotation axis of the engine shaft and is free to oscillate around a notional axis substantially parallel to the rotation axis of the engine shaft. When the masses of a pendulum oscillator react to rotational inconsistencies, they move in such a way that a center of gravity of each of the pendulum masses oscillates around an axis substantially parallel to the rotation axis of the engine shaft. The radial position of the center of gravity of each pendulum mass with respect to the rotation axis of the engine shaft, as well as the distance of the center of gravity with respect to the notional oscillation axis, are established so that in response to centrifugal forces, the oscillation frequency of each of the pendulum masses is proportional to the rotation speed of the engine shaft.

While hydrokinetic torque coupling devices and torsion damping devices, including but not limited to that discussed above, have proven to be acceptable for vehicular driveline applications and conditions, improvements that may enhance their performance and cost are possible.

BRIEF SUMMARY OF THE INVENTION

According to a first aspect of the invention, there is provided a torsional vibration damper for a hydrokinetic torque coupling device. The torsional vibration damper of the present invention comprises a driven plate rotatable about a rotation axis, an intermediate plate rotatably mounted about the driven plate coaxially with the rotation axis, a back plate rotatably mounted about the intermediate plate coaxially with the rotation axis, a plurality of circumferentially acting elastic members interposed between the driven plate and the intermediate plate, and a damper retainer plate non-moveably secured to the back plate coaxially with the rotation axis. The damper retainer plate is operatively connected to the elastic members. The driven plate, the intermediate plate and the back plate are aligned with each other along a radial axis perpendicular to the rotation axis.

According to a second aspect of the present invention, there is provided a hydrokinetic torque coupling device for coupling together a driving shaft and a driven shaft. The hydrokinetic torque coupling device comprises a casing rotatable about a rotation axis, a torque converter including an impeller wheel and a turbine wheel disposed in the casing coaxially with the rotation axis, a turbine hub, a lock-up clutch including a locking piston axially moveable along the rotation axis to and from a substantially radial locking wall of the casing so as to selectively engage the locking piston against the locking wall of the casing, and a torsional vibration damper. The torsional vibration damper comprises a drive plate rotatable about the rotation axis and fixed to the locking piston, a driven plate non-rotatably coupled to the drive plate and mounted about the drive plate coaxially with the rotation axis, an intermediate plate rotatably mounted about the driven plate coaxially with the rotation axis, a back plate rotatably mounted about the intermediate plate coaxially with the rotation axis, a plurality of circumferentially acting elastic members interposed between the driven plate and the intermediate plate, and a damper retainer plate non-moveably secured to the back plate coaxially with the rotation axis. The damper retainer plate is operatively connected to the elastic members. The first damper retainer plate fixed to the turbine hub. The driven plate, the intermediate plate and the back plate are aligned with each other along a radial axis perpendicular to the rotation axis.

According to a third aspect of the invention, there is provided a torsional vibration damper for a hydrokinetic torque coupling device. The torsional vibration damper of the present invention comprises a driven plate rotatable about a rotation axis, an intermediate plate rotatably mounted about the driven plate coaxially with the rotation axis, a back plate rotatably mounted about the intermediate plate coaxially with the rotation axis, a plurality of circumferentially acting elastic members interposed between the driven plate and the intermediate plate, and a damper retainer plate non-moveably secured to the back plate coaxially with the rotation axis. The damper retainer plate is operatively connected to the elastic members. The driven plate, the intermediate plate and the back plate are aligned with each other along a radial axis perpendicular to said rotation axis. Each of the driven plate, the intermediate plate and the back plate is in the form of a plate having axially opposite plane surfaces. The driven plate, the intermediate plate and the back plate have the same thicknesses in the direction of the rotation axis.

According to a fourth aspect of the invention, there is provided a method for manufacturing a torsional vibration damper for a hydrokinetic torque coupling device. The method of the present invention comprises the steps of: providing a blank sheet in the form of a flat plate having axially opposite plane surfaces and a uniform thickness, cutting the blank sheet so as to form a driven plate, an intermediate plate and a back plate, providing a plurality of elastic members, mounting the intermediate plate rotatably about the driven plate coaxially with an rotational axis of the torsional vibration damper, mounting the back plate rotatably about the intermediate plate coaxially with the rotation axis, and mounting the plurality of the elastic members circumferentially between the driven plate and the intermediate plate.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
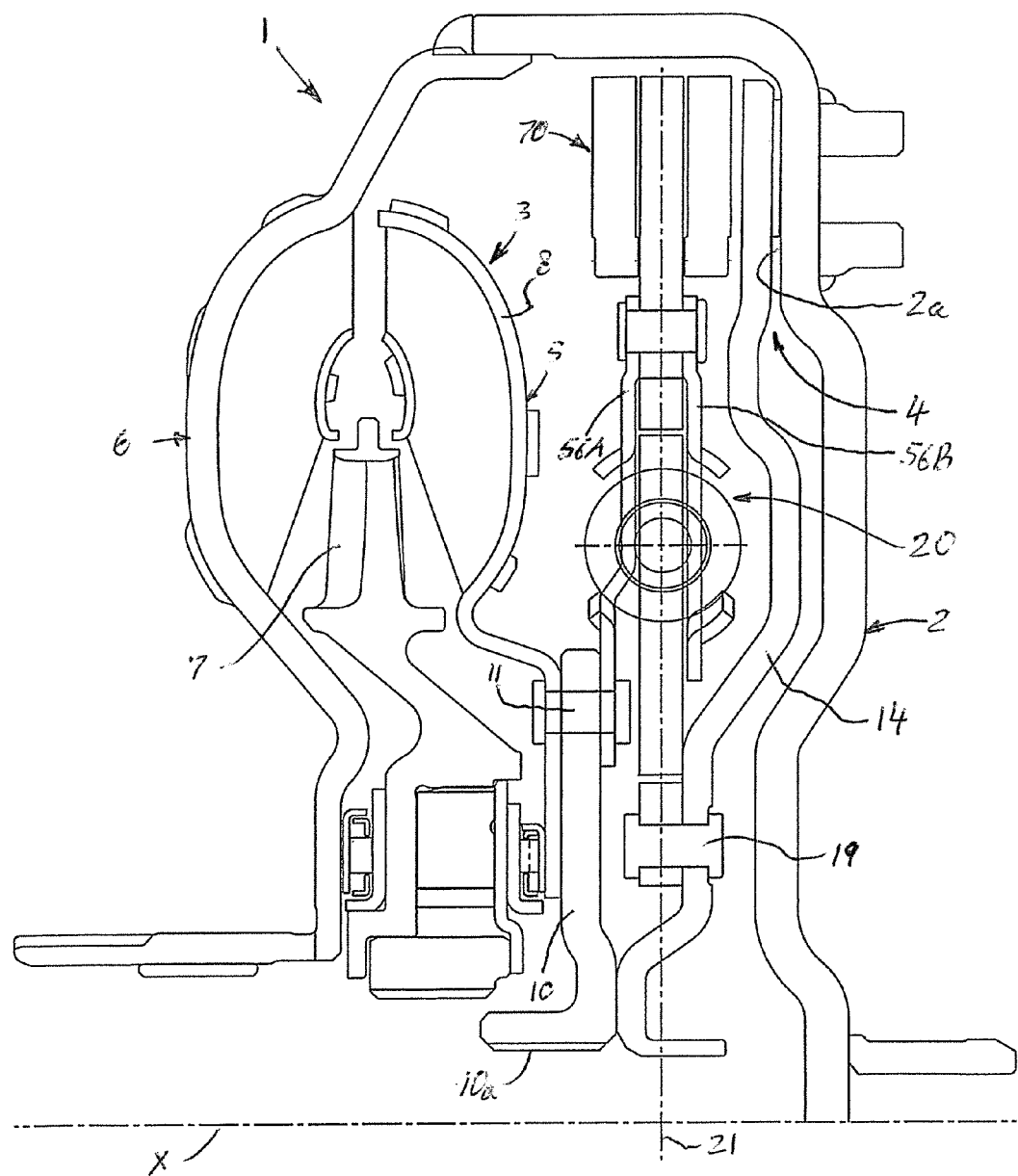
FIG. 1 is a fragmentary cross-sectional view of a hydrokinetic torque coupling device in accordance with an exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

An exemplary embodiment of a hydrokinetic torque coupling device is generally represented in the accompanying drawings by reference numeral 1, as best shown in a fragmentary sectional view in FIG. 1. The hydrokinetic torque coupling device 1, such as a hydrokinetic torque converter, is intended to couple driving and driven shafts, for example in a motor vehicle. In this case, the driving shaft is an output shaft of an internal combustion engine (not shown) of the motor vehicle and the driven shaft is connected to an automatic transmission of the motor vehicle.

The hydrokinetic torque coupling device 1 comprises a sealed casing 2 filled with oil and rotatable about a rotation axis X, a torque converter 3 and a lock-up clutch 4, both disposed in the sealed casing 2. Hereinafter the axial and radial orientations are considered with respect to the rotation axis X of the torque coupling device 1. The torque converter 3 comprises a turbine wheel 5, an impeller wheel 6, and a reactor (or stator) 7 interposed axially between the turbine wheel 5 and the impeller wheel 6. The turbine wheel 5 includes a substantially semi-toroidal turbine shell 8, best shown in FIGS. 1 and 2.

The torque coupling device 1 further includes a turbine hub 10 rotatable about the rotation axis X, which is arranged to non-rotatably couple together the driven shaft and the turbine wheel 5. In the following description, axial and radial orientations will be considered with respect to the rotation axis X of the turbine hub 10.

The turbine shell 8 of the turbine wheel 5 is non-movably (i.e., fixedly) secured to the turbine hub 10 by any appropriate means, such as by rivets 11 or welding. The turbine hub 10 has internal splines 10a and is non-rotatably coupled to the driven shaft, such as a transmission input shaft, provided with complementary external splines. The turbine hub 10 is rotatable about the axis X and is coaxial with the driven shaft so as to center the turbine wheel 3 on the driven shaft.

The lock-up clutch 4 is provided for locking the driving and driven shafts. The lock-up clutch 4 is generally activated after the starting of the motor vehicle and after the hydraulic coupling of the driving and driven shafts, in order to avoid the loss of efficiency caused in particular by slip phenomena between the turbine wheel 5 and the impeller wheel 6. Specifically, the lock-up clutch 4 is provided to bypass the impeller wheel 6 and the turbine wheel 5 in the closed state thereof.

Figure 2:
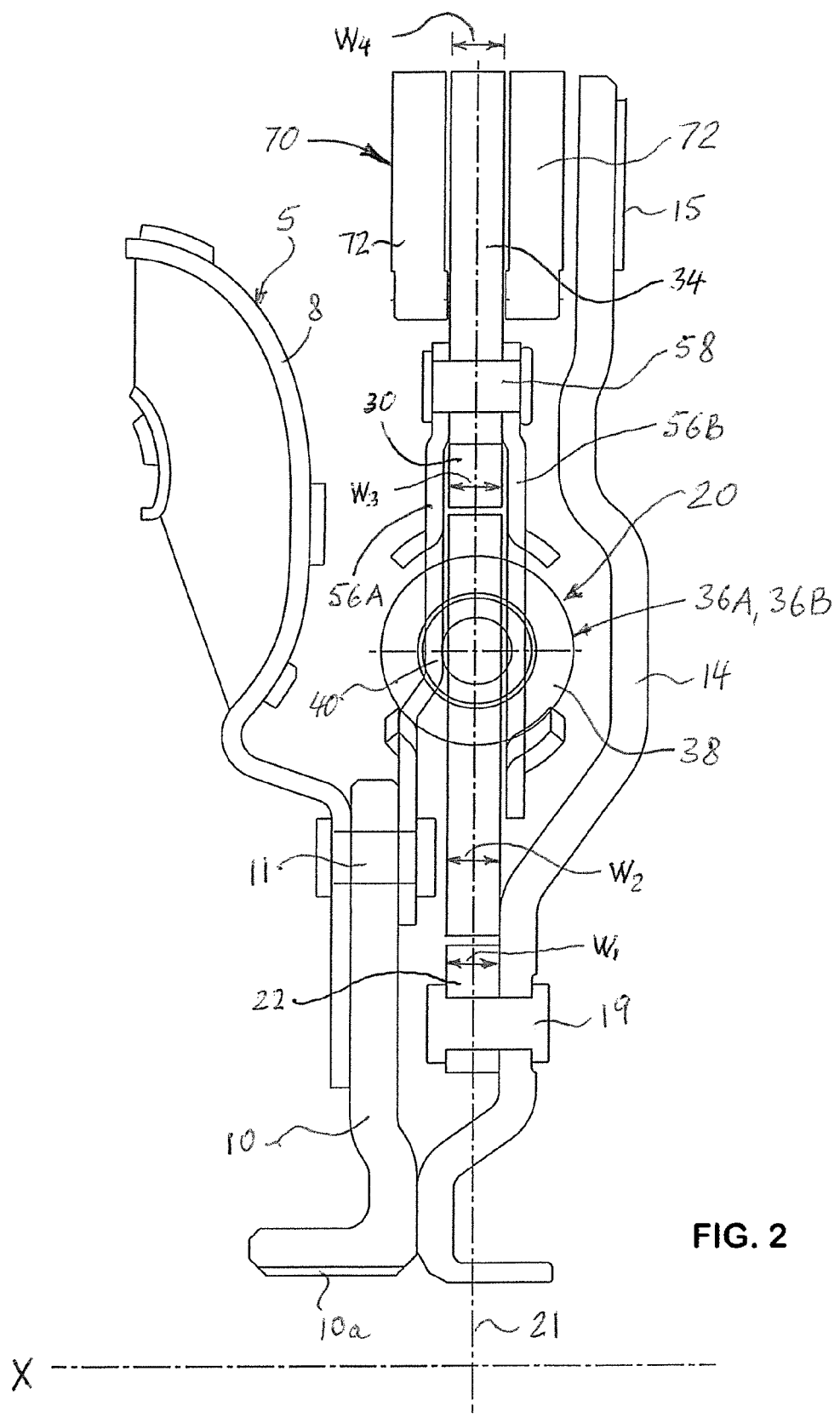
FIG. 2 is a fragmentary cross-sectional view of a torsional vibration damper in accordance with the exemplary embodiment of the present invention.
Figure 3:
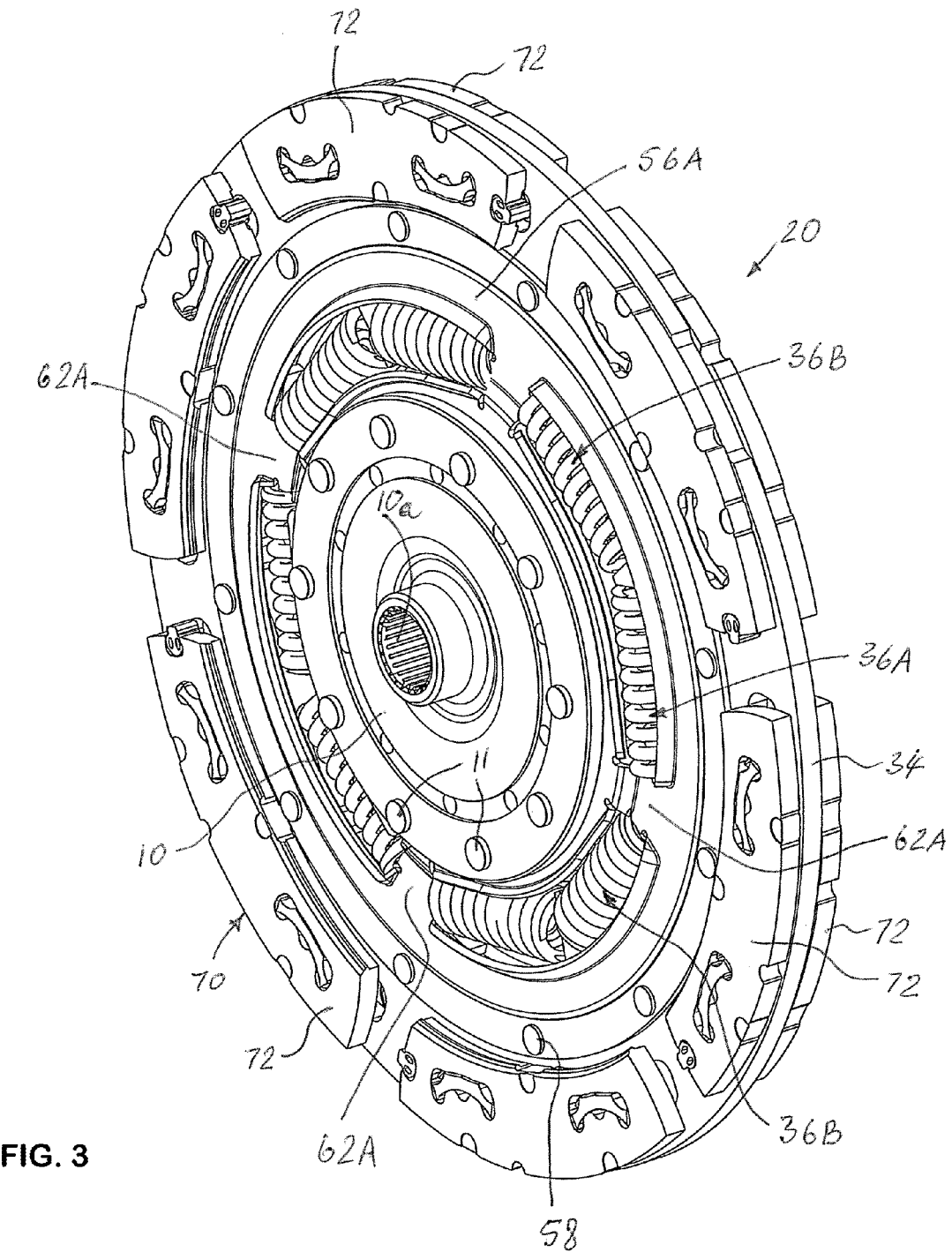
FIG. 3 is a perspective view of the torsional vibration damper in accordance with the exemplary embodiment of the present invention.
Figure 4:
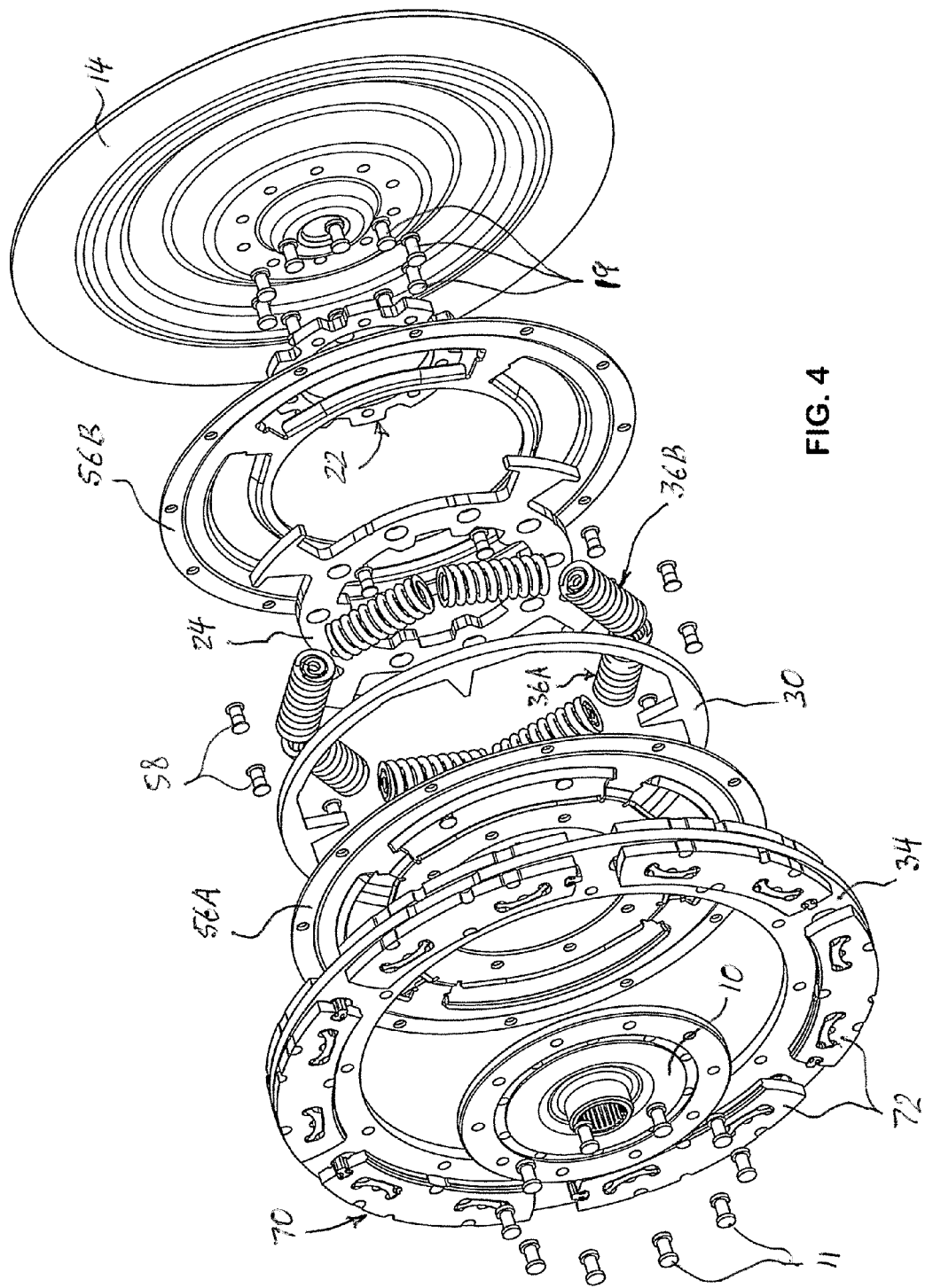
FIG. 4 is an exploded assembly view of the torsional vibration damper in accordance with the exemplary embodiment of the present invention.

The lock-up clutch 4 includes a substantially annular locking piston 14 including an annular friction liner 15 fixedly attached to an axially outer surface of the locking piston 14 that faces a locking wall 2a of the casing 2 by any appropriate means known in the art, such as by adhesive bonding. The locking piston 14 is axially displaceable toward and away from a locking wall 2a inside the casing 2. Moreover, the locking piston 14 is axially displaceable toward (an engaged (or locked) position of the lock-up clutch 4) and away (a disengaged (or open) position of the lock-up clutch 4) from the turbine hub 10. The locking piston 14a is provided to be selectively pressed against the locking wall 2a of the casing 2, so as to lock up the torque coupling device 1 between the shafts so to control sliding movement between the turbine wheel 5 and the impeller wheel 6. Specifically, when an appropriate hydraulic pressure in applied to the locking piston 14, the locking piston 14 moves rightward (as shown in FIGS. 1 and 2) toward the locking wall 2a of the casing 2 and away from the turbine hub 10, and clamps the friction liner 15 between itself and the locking wall 2a of the casing 2. As a result, the lock-up clutch 4 is in the locked position and is mechanically coupled with the turbine hub 10 so as to bypass the impeller wheel 6 and the turbine wheel 5 in the locked position of the lock-up clutch 4.

During operation, when the lock-up clutch 4 is in the disengaged (open) position, the engine torque is transmitted from the impeller wheel 6 by the turbine wheel 5 of the torque converter 3 to the turbine hub 10. When the lock-up clutch 4 is in the engaged (locked) position, the engine torque is transmitted by the casing 2 to the turbine hub 10 through the torsional vibration damper 20.

The torque coupling device 1 further comprises a circumferential torsional vibration damper 20 provided in the torque coupling device 1 in order to couple the casing 2 thereof, with torque damping, to an input shaft of an automatic transmission. The torsional vibration damper 20 advantageously allows the turbine wheel 5 of the torque converter 3 to be coupled, with torque damping, to the input shaft of the automatic transmission. The torsional vibration damper 20 also allows damping of the stress between a first, drive shaft (not shown) and a second, driven shaft (not shown) that are coaxial with the rotation axis X, with torsion damping.

The torsional vibration damper 20, best shown in FIGS. 3-7, is disposed between the turbine hub 10 that is fixedly connected with the turbine shell 8 of the turbine wheel 3 and the locking piston 14 of the lock-up clutch 4. Moreover, the locking piston 14 of the lock-up clutch 4 is coupled to the turbine wheel 5 and the turbine hub 10 by the torsional vibration damper 20. The torsional vibration damper 20 is arranged on the turbine hub 10 in a limitedly movable and centered manner. The turbine hub 10 forms an output part of the torsional vibration damper 20 and the driven side of the torque coupling device 1, and is splined with the driven shaft. The locking piston 14, on the other hand, forms an input part of the torsional vibration damper 20.

During the operation, when the lock-up clutch 4 is in the disengaged (open) position, the engine torque is transmitted by the turbine wheel 5 of the torque converter 3 from the impeller wheel 6 to the turbine hub 10, bypassing the torsional vibration damper 20. However, when the lock-up clutch 4 is in the engaged (locked) position, the engine torque is transmitted by the casing 2 to the turbine hub 10 through the torsional vibration damper 20.

As best shown in FIGS. 3-7, the torsional vibration damper 20 comprises a substantially annular drive plate 22 non-movably (i.e., fixedly) secured to the locking piston 14, a substantially annular driven plate 24 mounted over the drive plate 22 and non-rotatably coupled thereto, a substantially annular intermediate plate 30 mounted over the driven plate 24 and rotatably moveable relative thereto, and a substantially annular pendulum back plate 34 mounted over the intermediate plate 30 and rotatably moveable relative thereto. Placing the intermediate plate 30 inside of the pendulum back plate 34 ensures centering of the intermediate plate 30 and increases the rigidity thereof. As best shown in FIGS. 1-6, the annular drive plate 22, the annular driven plate 24, the annular intermediate plate 30 and the annular pendulum back plate 34 are coaxial with each other and rotatable about the rotation axis X. The drive plate 22 is fixedly secured to the locking piston 14 by any appropriate means, such as by rivets 19 or welding.

The torsional vibration damper 20 further comprises a plurality of first circumferentially acting elastic members 36A and a plurality of second circumferentially acting elastic members 36B disposed in series relative to each other between the driven plate 24 and the intermediate plate 30. According to the exemplary embodiment of the present invention, the first and second elastic members 36A and 36B are identical to each other. In non-limiting fashion, the torsional vibration damper 20 according to the exemplary embodiment of the present invention has eight elastic members 36A, 36B, as best shown in FIGS. 3-6. Further according to the exemplary embodiment of the present invention, the elastic members 36A, 36B are in the form of helical (or coil) springs having a principal axis oriented substantially circumferentially. Furthermore, each of the first and second elastic members 36A and 36B includes a pair of coaxial helical springs, as best shown in FIGS. 2 and 6. Specifically, as illustrated in FIGS. 2 and 6, each of the first and second elastic members 36A and 36B includes an external large-diameter spring 38 and an internal small-diameter spring 40, arranged coaxially so that the internal spring 40 is disposed within the external spring 38. Moreover, the external spring 38 has a longer length and is produced from a larger diameter wire than the internal spring 40, thus providing variable stiffness of the first and second elastic members 36A, 36B. Alternatively, each of the first and second elastic members 36A and 36B includes only one coaxial helical spring.

The drive plate 22, the driven plate 24, the intermediate plate 30 and the pendulum back plate 34 each is in the form of a substantially annular plate having axially opposite and substantially plane (or flat) surfaces. It is well known in the art that a plane surface is a surface in which if any two points are chosen a straight line joining them lies wholly in that surface. It is also known in the art that even for a single planar plate, the axially opposite surfaces are not perfectly planar (or flat) as they are subject to manufacturing tolerances (or variations) around a nominal value as allowed in the production thereof. The present invention seeks to substantially approximate axially opposite plane surfaces of the annular plate so that the axially opposite plane surfaces are substantially planar surfaces.

Moreover, the opposite plane surfaces of each of the drive plate 22, the driven plate 24, the intermediate plate 30 and the pendulum back plate 34 have free radially outer and inner perimeters lying in the same plane. Furthermore, the driven plate 24, the intermediate plate 30 and the pendulum back plate 34 are aligned (or are in alignment) with each other along a radial axis 21, as best shown in FIG. 2. When centers of gravity are aligned, bending effect on the driven plate 24, the intermediate plate 30 and the back plate 34 under high speed rotational loading of masses and springs is avoided. The radial axis 21 is perpendicular to the rotation axis X. When the lock-up clutch 4 is in the disengaged (open) position thereof, the drive plate 22 is also axially and radially aligned with the driven plate 24, the intermediate plate 30 and the pendulum back plate 34 of the torsional vibration damper 20.

Moreover, the drive plate 22, the driven plate 24, the intermediate plate 30 and the pendulum back plate 34 have the same thickness in the axial direction, i.e., in the direction of the rotation axis X. Such an arrangement reduces a number of stamping blanks and minimizes scrap waste, thus reducing manufacturing cost. In other words, as best shown in FIG. 2, a thickness $W_1$ of the drive plate 22 in the axial direction equals a thickness $W_2$ of the driven plate 24 in the axial direction, which, in turn, equals a thickness $W_3$ of the intermediate plate 30 and a thickness $W_4$ of the back plate 34. Furthermore, the drive plate 22, the driven plate 24, the intermediate plate 30 and the pendulum back plate 34 are made of the same material, such as steel.

The drive plate 22 is provided with external splines 23 engaging complementary internal splines 25 of the driven plate 24. As a result, the drive plate 22 is non-rotatably coupled to the driven plate 24 and is axially displaceable relative to the driven plate 24 in the direction of the rotation axis X due to spline connection between the drive plate 22 and the driven plate 24. As the drive plate 22 is fixedly secured to the locking piston 14, the locking piston 14 is also axially displaceable relative to the driven plate 24 along the rotation axis X.

The driven plate 24 is formed with a plurality of external radial lugs 44 that are arranged to cooperate with the circumferentially acting the elastic members 36A, 36B. As illustrated, the external radial lugs 44 extend radially outwardly from a generally annular body portion 46 of the driven plate 24. Moreover, the external radial lugs 44 are spaced apart circumferential equidistantly around the rotation axis X. Each of the external radial lugs 44 has circumferentially first and second radial retention faces 45A and 45B, respectively. As shown in FIG. 6, the first retention faces 45A of the external radial lugs 44 engage the first elastic members 36A, while the second retention faces 45B of the external radial lugs 44 engage the second elastic members 36B. Also, each of the external radial lugs 44 has two opposite, circumferentially extending gripping portions 49 provided for retaining distal ends of the elastic members 36A, 36B on the retention faces 45A and 45B of each of the external radial lugs 44. A substantially cylindrical outer peripheral surface 48 of each of the external radial lugs 44 is adjacent and complementary to a substantially cylindrical inner peripheral surface 50 of the intermediate plate 30.

Similarly, the intermediate plate 30 is formed with a plurality of internal radial lugs 52 which are arranged to cooperate with the circumferentially acting the elastic members 36A, 36B. As illustrated, the internal radial lugs 52 extend radially inwardly from a generally annular body portion 54 of the intermediate plate 30. Moreover, the internal radial lugs 52 are spaced apart circumferentially equidistantly around the rotation axis X. Each of the internal radial lugs 52 has circumferential first and second radial retention faces 53A and 53B, respectively. As shown in FIG. 6, the first retention faces 53A of the internal radial lugs 52 face the second retention faces 45B of the external radial lugs 44 and engage the second elastic members 36B, while the second retention faces 53B of the internal radial lugs 52 face the first retention faces 45A of the external radial lugs 44 and engage the first elastic members 36A. In non-limiting fashion, in accordance with the exemplary embodiment of the present invention, each of the internal radial lugs 52 has a substantially triangular shape extending radially inwardly. A substantially cylindrical outer peripheral surface 48 of each of the radial lugs 44 is adjacent and complementary to a substantially cylindrical inner peripheral surface 50 of the intermediate plate 30.

As further shown in FIG. 6, the elastic members 36A, 36B of each pair are disposed and compressed between the external radial lugs 44 of the driven plate 24 and the internal radial lugs 52 of the intermediate plate 30 in order to damp sudden changes in torque.

The annular pendulum back plate 34 is formed with a central aperture for fitting on the annular intermediate plate 30. The central aperture in the pendulum back plate 34 is defined by a cylindrical inner peripheral surface 42 of the back plate 34, which is adjacent and complementary to a substantially cylindrical outer peripheral surface 32 of the intermediate plate 30.

The torsional vibration damper 20 further comprises a first, front damper retainer plate 56A and a second, rear damper retainer plate 56B. The first and second damper retainer plates 56A, 56B are axially mounted to opposite sides of the back plate 34 so as to be oriented parallel to each other and coaxially with the rotation axis X. Moreover, the first and second damper retainer plate 56A, 56B are arranged axially on either side of the elastic members 36A, 36B and are operatively connected therewith. The first and second damper retainer plates 56A, 56B are non-movably (i.e., fixedly) secured to the axially opposite sides of the back plate 34 by any appropriate means, such as by rivets 58 or welding. Moreover, as best shown in FIG. 2, the first damper retainer plate 56A is fixedly secured to the turbine hub 10, such as by rivets 11.

Specifically, the first damper retainer plate 56A has a substantially annular outer mounting flange 57A provided with a plurality of circumferentially spaced holes 59A, and a substantially annular inner mounting flange 61 provided with a plurality of circumferentially spaced holes 63. The second damper retainer plate 56B, on the other hand, has a substantially annular outer mounting flange 57B provided with a plurality of circumferentially spaced holes 59B. The first and second damper retainer plates 56A, 56B are non-movably (i.e., fixedly) secured to the back plate 34 so that the outer mounting flanges 57A, 57B of the first and second damper retainer plate 56A, 56B are engaging the axially opposite surfaces of the back plate 34 by the rivets 58 extending through the holes 59A, 59B in the outer mounting flanges 57A, 57B of the first and second damper retainer plates 56A, 56B and corresponding through holes in the back plate 34. The first damper retainer plate 56A is fixedly secured to the turbine hub 10 by the rivets 11 extending through the holes 63 in the inner mounting flange 61 of the first damper retainer plate 56A. In other words, the turbine shell 8 of the turbine wheel 5, the turbine hub 10 and the first damper retainer plate 56A are non-movably secured to each other. As further illustrated in FIGS. 1 and 2, the first and second damper retainer plate 56A, 56B are axially spaced from the radial axis 21, i.e., from the driven plate 24, the intermediate plate 30 and the pendulum back plate 34.

Figure 5:
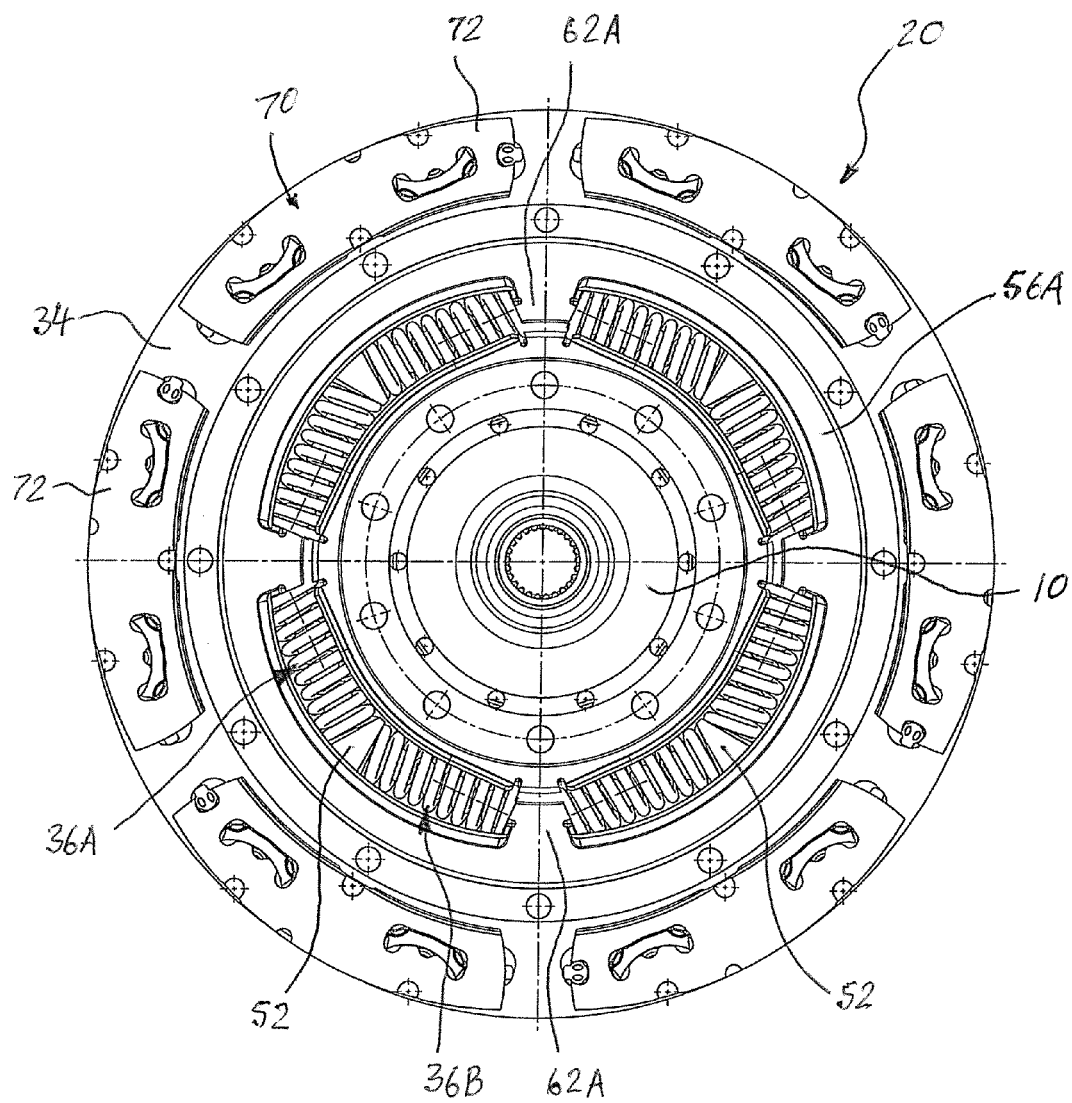
FIG. 5 is a front view of the torsional vibration damper in accordance with the exemplary embodiment of the present invention.
Figure 6:
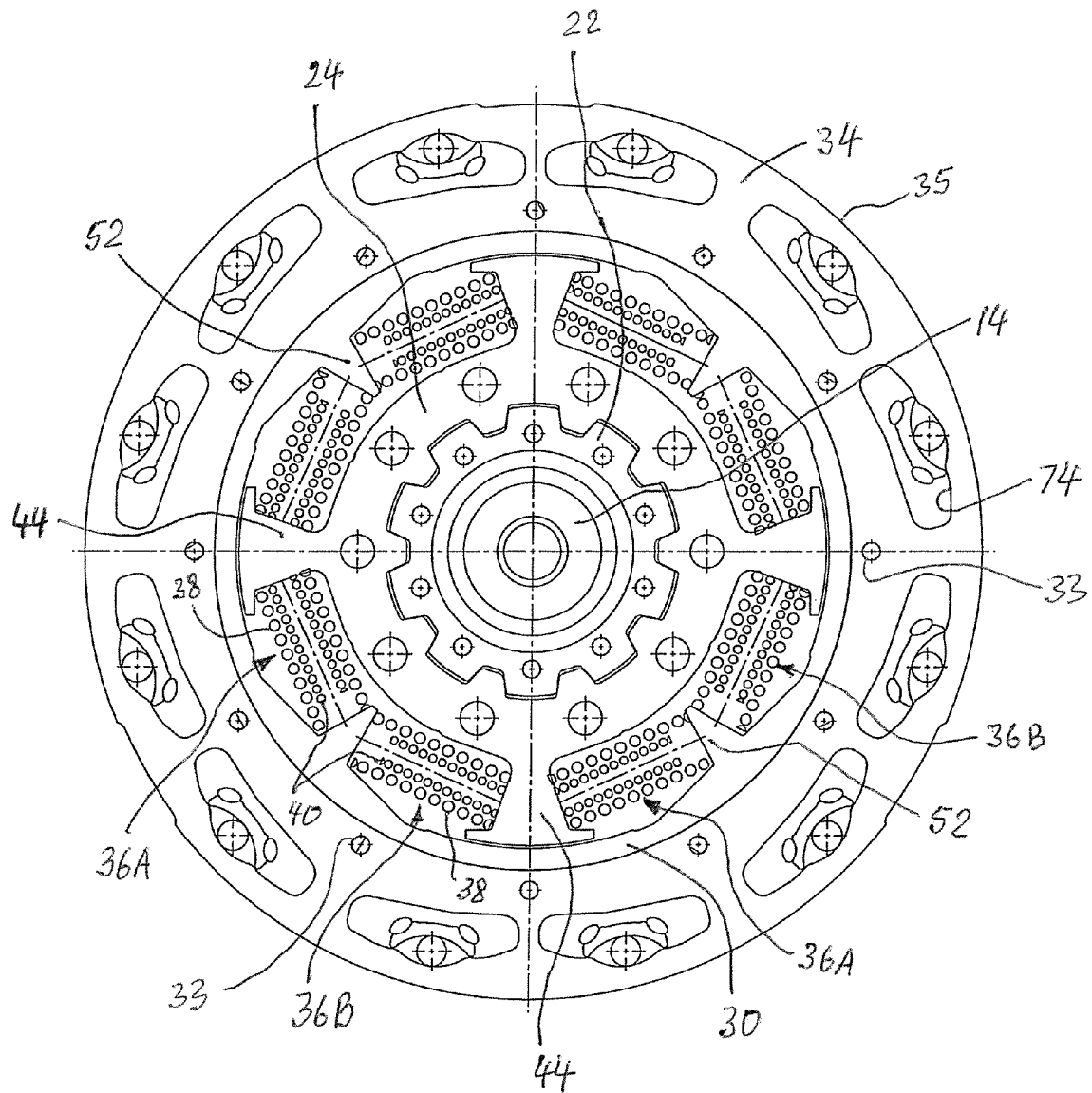
FIG. 6 is a front view of the torsional vibration damper in accordance with an exemplary embodiment of the present invention without damper retainer plates.
Figure 7:
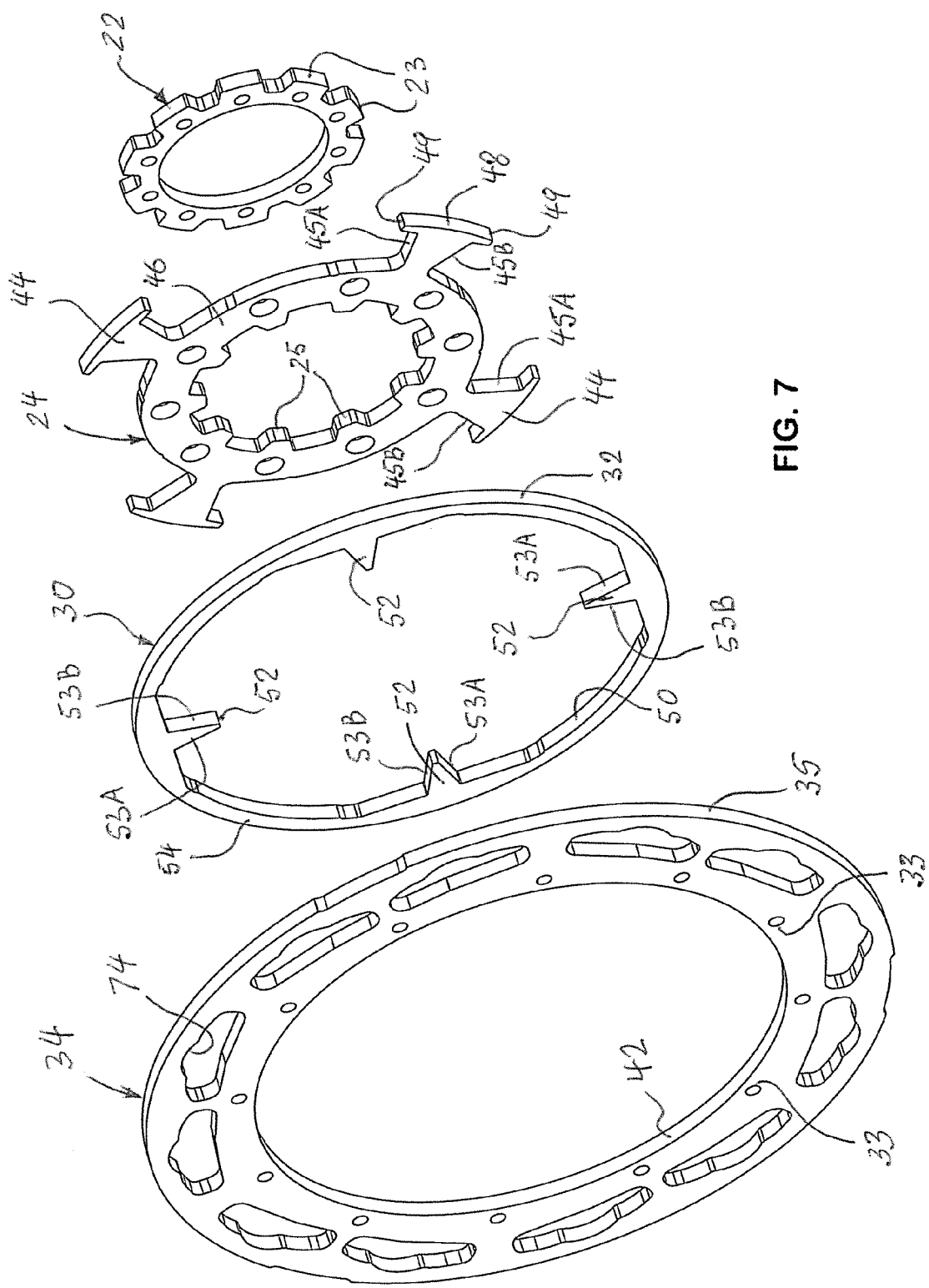
FIG. 7 is an exploded assembly view of the torsional vibration damper in accordance with the exemplary embodiment of the present invention without damper retainer plates and elastic members.
Figure 8:
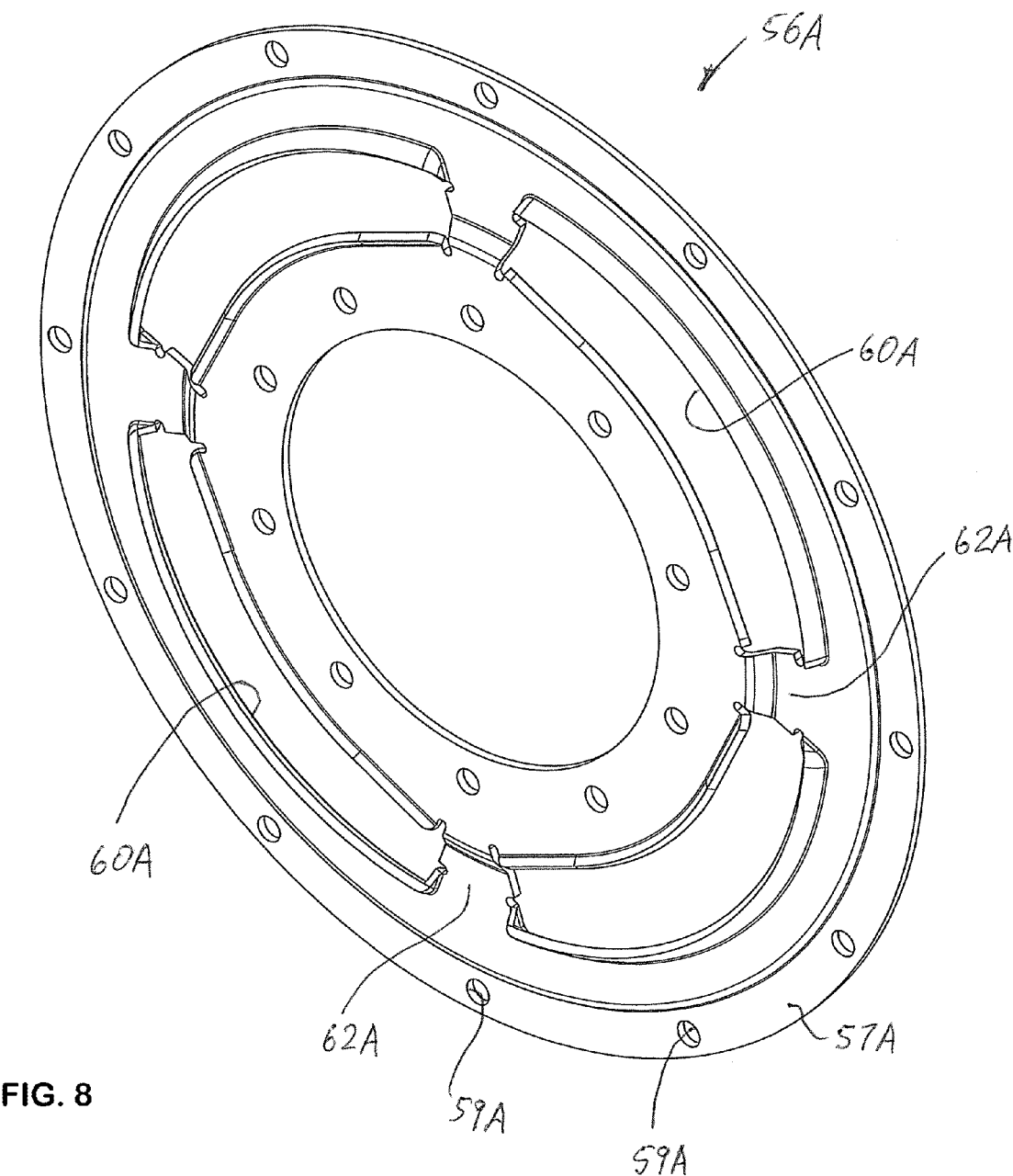
FIG. 8 is a perspective view of a first damper retainer plate of the torsional vibration damper in accordance with the exemplary embodiment of the present invention.
Figure 9:
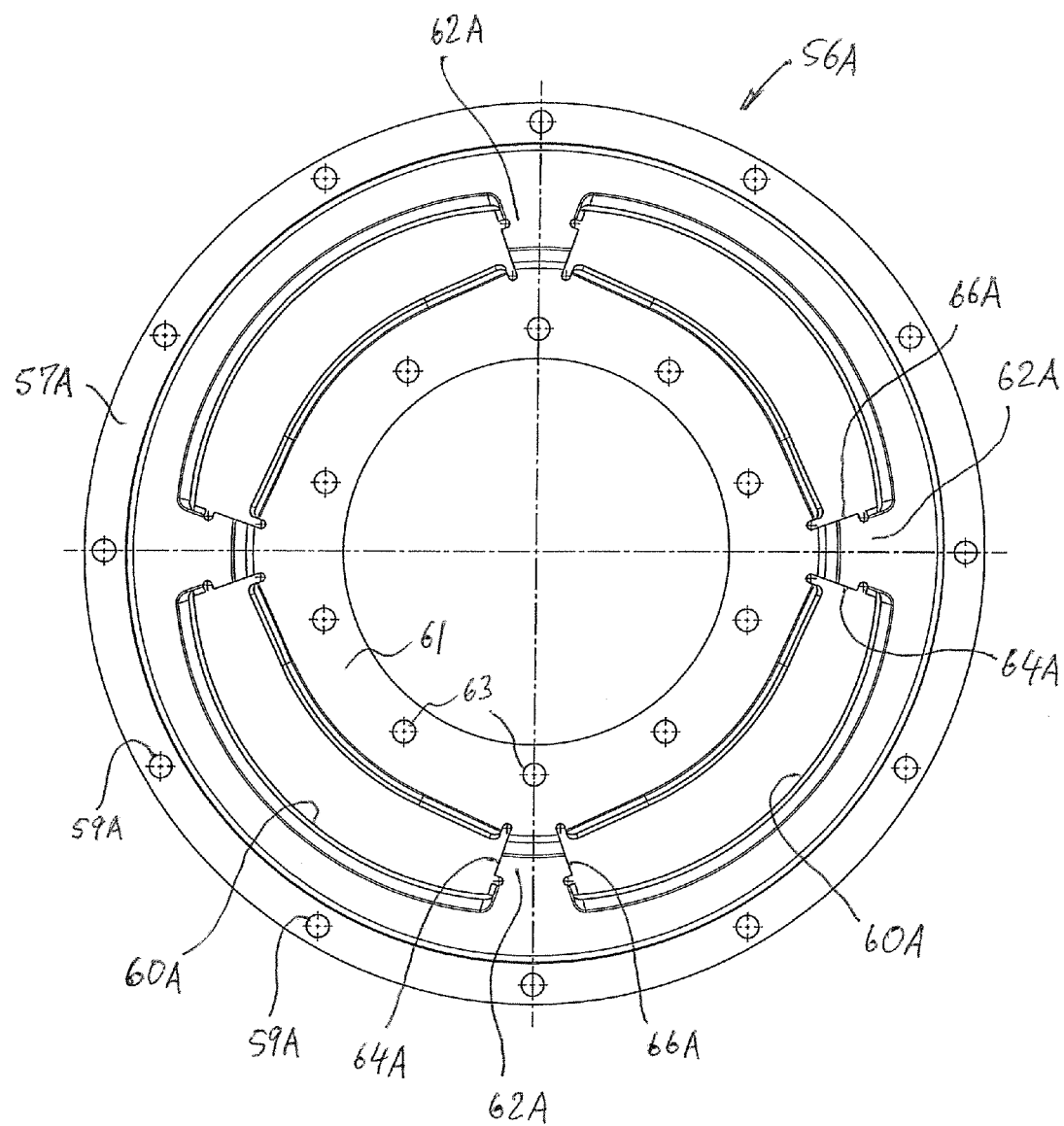
FIG. 9 is a front view of the first damper retainer plate of the torsional vibration damper in accordance with the exemplary embodiment of the present invention.
Figure 10:
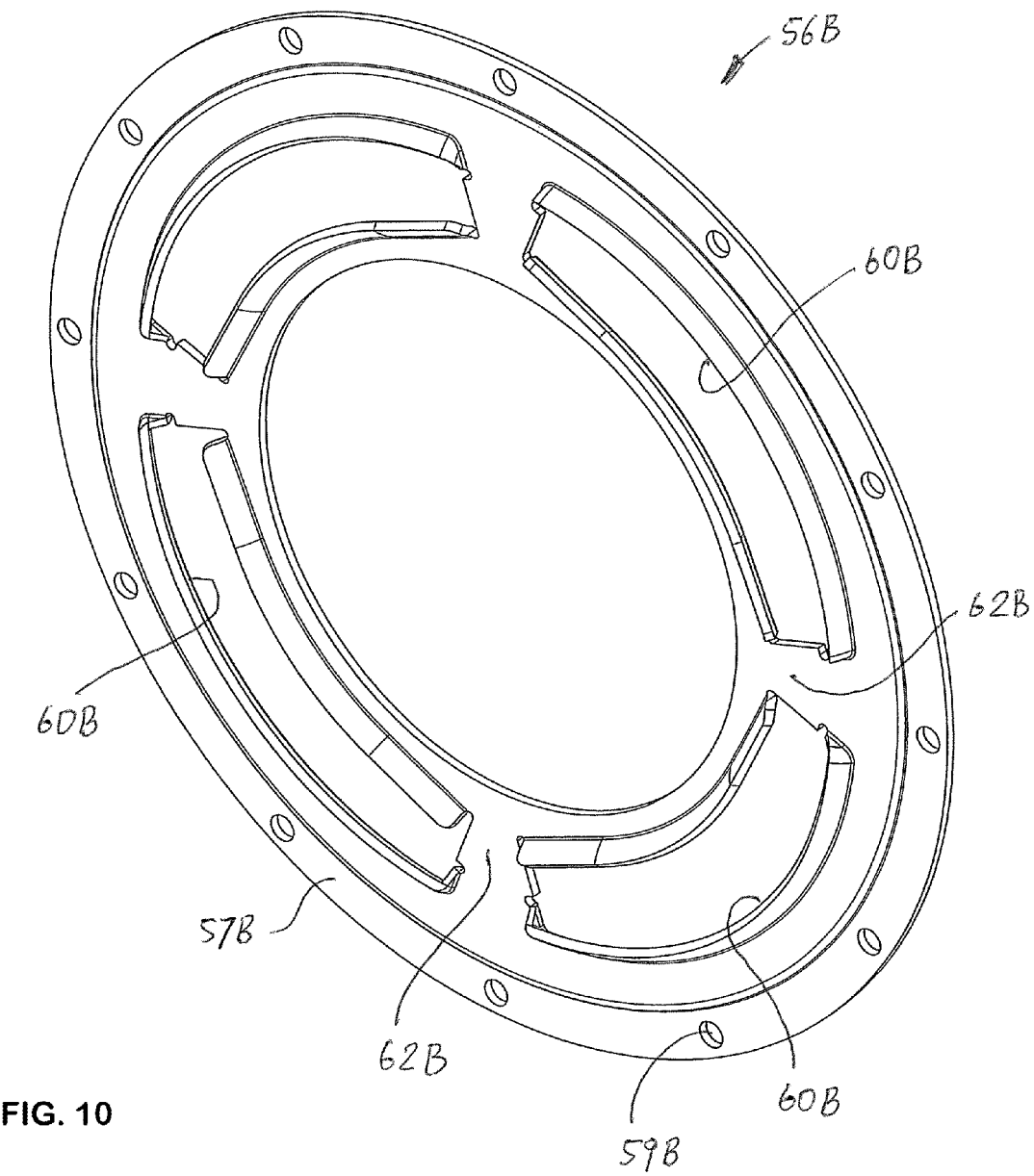
FIG. 10 is a perspective view of a second damper retainer plate of the torsional vibration damper in accordance with the exemplary embodiment of the present invention.
Figure 11:
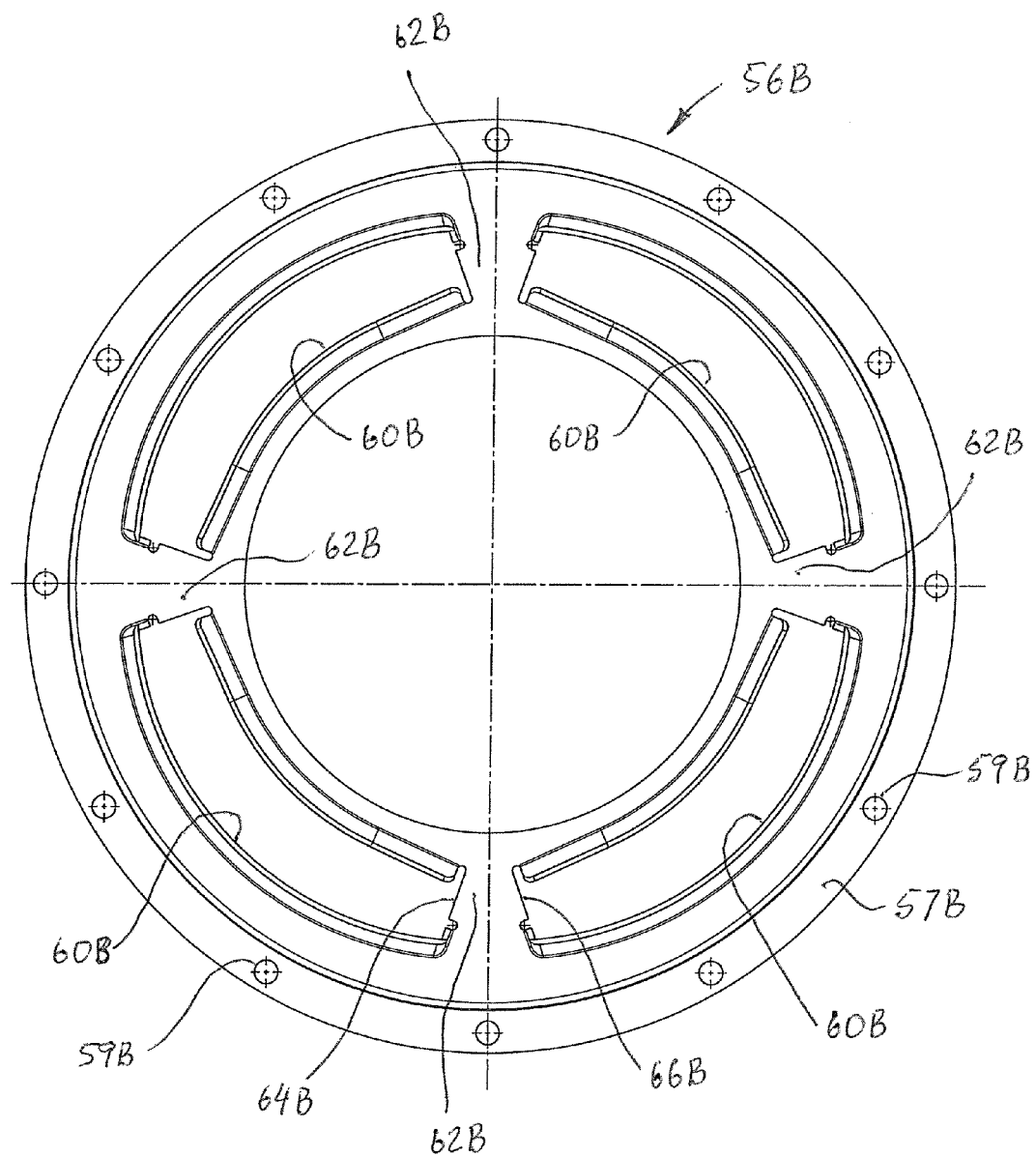
FIG. 11 is a front view of the second damper retainer plate of the torsional vibration damper in accordance with the exemplary embodiment of the present invention.

Each of the first and second damper retainer plates 56A, 56B is provided with a plurality of circumferentially extending windows 60A, 60B, respectively, each of which is arranged in correspondence with a pair of the elastic member 36A, 36B, as depicted in FIG. 5. In other words, each of the windows 60A, 60B receives a single pair of elastic members: one of the first elastic members 36A and one of the second elastic members 36B separated by the internal radial lug 52 of the intermediate plate 30, as best shown in FIGS. 5 and 6.

The windows 60A, 60B are separated circumferentially from one another alternately by radial tabs 62A, 62B. Each of the first and second damper retainer plates 56A, 56B according to the exemplary embodiment of the present invention has four windows 60A, 60B and four radial tabs 62A, 62B. Moreover, each of the windows 60A, 60B, or each of the radial tabs 62A, 62B, is delimited circumferentially by a first radial end face 64A, 64B on the one hand, and by a second radial end face 66A, 66B on the other hand, oriented circumferentially opposite to each other. Thus, each of the radial tabs 62A, 62B is interposed circumferentially between the two elastic members 36A, 36B in series of each pair. The first radial end face 64A, 64B and the second radial end face 66A, 66 that are interposed between elastic members 36A, 36B of a single pair are thus carried by one common radial tab 62A, 62B.

The radial tabs 62A of the first retainer plate 56A are arranged in axial correspondence (i.e., radially aligned) with the radial tabs 62B of second retainer plate 56B. As best shown in FIGS. 5 and 6, the external radial lugs 44 of the driven plate 24 is radially aligned with the radial tabs 62A, 62B separating the windows 60A, 60B in the first and second damper retainer plates 56A, 56B.

The torsional vibration damper 20 further comprises a centrifugal pendulum oscillator 70 coaxial with the rotation axis X. The centrifugal pendulum oscillator 70 includes a plurality of pairs of axially opposed pendulum masses (or flyweights) 72 arranged on an outer radial periphery of the back plate 34 in order to be subjected to a maximum centrifugal force in the course of the rotation of the torsional vibration damper 20 around the rotation axis X, as best shown in FIGS. 1-5. The pendulum masses 72 are mounted to the pendulum back plate 34 on axially opposite sides thereof and adjacent to an outer peripheral surface 35 thereof. The pendulum masses 72 are connected to each other through a through opening 74 in the pendulum back plate 34 to create a pendulum mass pair moveable relative to the back plate 34. The flyweights 72 are arranged radially on the same diameter, i.e. at the same distance from the rotation axis X, and outside the elastic members 36A, 36B.

The operation of the torsional vibration damper 20 in the locked position is as follows. The abrupt changes in torque are transmitted from the locking piston 14 to the drive plate 22, which constitutes an input member of the torsional vibration damper 20, and from the drive plate 22 to the driven plate 24. The elastic members of each pair of the elastic members 36A, 36B are compressed between the external radial lugs 44 of the driven plate 24 and the internal radial lugs 52 of the intermediate plate 30 in order to damp abrupt changes in torque. Specifically, each of the external radial lugs 44 loads the associated one of the elastic members 36A, 36B. The one of the elastic members 36A, 36B conveys this torque to another of the elastic members 36A, 36B via the internal radial lugs 52. Then, the other of the elastic members 36A, 36B transmit the force to the associated radial tabs 62A, 62B of the first and second damper retainer plates 56A, 56B. More specifically, the driven plate 24 rotates through a defined angle around rotation axis X with respect to the intermediate plate 30, causing simultaneous compression of the elastic members 36A, 36B of each pair. The external radial lugs 44 of the driven plate 24 transmit the compressive force from one of the elastic members 36A, 36B to the other through the internal radial lugs 52 of the intermediate plate 30. Because of this compression, the first and second damper retainer plates 56A, 56B rotate through a portion of the defined angle with respect to the driven plate 24. Subsequently, the torque, dampened by the elastic members 36A, 36B, is transmitted from the first damper retainer plate 56A, which constitutes an output member of the torsional vibration damper 20, to the turbine hub 10.

The method of manufacturing of the torsional vibration damper 20 comprises the following major steps. First, a blank sheet of material, such as steel, is provided in the form of a flat steel sheet having axially opposite substantially planar surfaces and a uniform thickness. Then, the drive plate 22, the driven plate 24, the intermediate plate 30 and the back plate 34 are cut from the same blank sheet, such as by stamping. Next, the driven plate 24 is mounted about the drive plate 22 so that the external splines 23 of the drive plate 22 engage the complementary internal splines 25 of the driven plate 24. Then, the intermediate plate 30 is rotatably mounted about the driven plate 24 coaxially with the rotation axis X. After that, the back plate 34 is rotatably mounted about the intermediate plate 30 coaxially with the rotation axis X. Next, the elastic members 36A, 36B are mounted circumferentially between the external radial lugs 44 of the driven plate 24 and the internal radial lug 52 of the intermediate plate 30. Subsequently, the first and second damper retainer plates 56A, 56B are fixedly attached to the axially opposite sides of the back plate 34 by the rivets 58 or by welding so that the elastic members 36A, 36B are disposed axially between the first and second damper retainer plates 56A, 56B, and in the windows 60A, 60B in the first and second damper retainer plates 56A, 56B.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torsional vibration damper for a hydrokinetic torque coupling device, comprising:
   a driven plate rotatable about a rotation axis, said driven plate having opposite radially extending planar first and second driven plate surfaces and a first thickness extending between said first and second driven plate surfaces;
   an intermediate plate rotatably mounted about said driven plate coaxially with said rotation axis, said intermediate plate having opposite radially extending planar first and second intermediate plate surfaces and a second thickness extending between said first and second intermediate plate surfaces;
   a back plate rotatably mounted about said intermediate plate coaxially with said rotation axis, said back plate having opposite radially extending planar first and second back plate surfaces and a third thickness extending between said first and second back plate surfaces;
   a plurality of circumferentially acting elastic members interposed between said driven plate and said intermediate plate; and a first damper retainer plate non-moveably secured to said back plate coaxially with said rotation axis, said first damper retainer plate operatively connected to said elastic members;

said first driven plate surface, said first intermediate plate surface, and said first back plate surface extending radially in coplanar alignment with one another along a first radial axis perpendicular to said rotation axis; and said second driven plate surface, said second intermediate plate surface, and said second back plate surface extending radially in coplanar alignment with one another along a second radial axis perpendicular to said rotation axis.

2. The torsional vibration damper as defined in claim 1, wherein said first, second, and third thicknesses are the same.

3. The torsional vibration damper as defined in claim 2, wherein said driven plate, said intermediate plate and said back plate are made of the same material.

4. The torsional vibration damper as defined in claim 1, further comprising a drive plate rotatable about said rotation axis; wherein said driven plate is non-rotatably coupled to said drive plate and mounted about said drive plate coaxially with said rotation axis.

5. The torsional vibration damper as defined in claim 4, wherein said drive plate has opposite radially extending planar first and second drive plate surfaces, wherein said first drive plate surface is coplanarly alignable along said first radial axis with said first driven plate surface, said first intermediate plate surface, and said first back plate surface, and wherein said second drive plate surface is simultaneously coplanarly alignable along said second radial axis with said second driven plate surface, said second intermediate plate surface, and said second back plate surface.

6. The torsional vibration damper as defined in claim 5, wherein said drive plate has a fourth thickness extending between said first drive plate surface and said second drive plate surface, and wherein said first, second, third, and fourth thicknesses are the same.

7. The torsional vibration damper as defined in claim 6, wherein said drive plate, said driven plate, said intermediate plate and said back plate are made of the same material.

8. The torsional vibration damper as defined in claim 1, further comprising a centrifugal pendulum oscillator mounted to said back plate coaxially with said rotation axis and aligned with said driven plate, said intermediate plate and said back plate along said radial axis.

9. The torsional vibration damper as defined in claim 1, further comprising a second damper retainer plate non-moveably secured to said back plate opposite to said first damper retainer plate and coaxially with said rotation axis, said second damper retainer plate operatively connected to said elastic members.

10. A hydrokinetic torque coupling device for coupling together a driving shaft and a driven shaft, said hydrokinetic torque coupling device comprising:
 a casing rotatable about a rotation axis;
 a torque converter including an impeller wheel and a turbine wheel disposed in said casing coaxially with said rotation axis;
 a turbine hub;
 a lock-up clutch including a locking piston axially moveable along said rotation axis to and from a substantially radial locking wall of said casing so as to selectively engage said locking piston against said locking wall of said casing; and a torsional vibration damper comprising
  a drive plate rotatable about said rotation axis and fixed to said locking piston, said drive plate having opposite radially extending planar first and second drive plate surfaces and a first thickness extending between said first and second drive plate surfaces;
  a driven plate non-rotatably coupled to said drive plate and mounted about said drive plate coaxially with said rotation axis, said driven plate having opposite radially extending planar first and second driven plate surfaces and a second thickness extending between said first and second driven plate surfaces;
  an intermediate plate rotatably mounted about said driven plate coaxially with said rotation axis, said intermediate plate having opposite radially extending planar first and second intermediate plate surfaces and a third thickness extending between said first and second intermediate plate surfaces;
  a back plate rotatably mounted about said intermediate plate coaxially with said rotation axis, said back plate having opposite radially extending planar first and second back plate surfaces and a fourth thickness extending between said first and second back plate surfaces;
  a plurality of circumferentially acting elastic members interposed between said driven plate and said intermediate plate; and
  a first damper retainer plate non-moveably secured to said back plate coaxially with said rotation axis, said first damper retainer plate operatively connected to said elastic members;
  said first damper retainer plate fixed to said turbine hub;
  said first driven plate surface, said first intermediate plate surface, and said first back plate surface extending radially in coplanar alignment with one another along a first radial axis perpendicular to said rotation axis;
  said second driven plate surface, said second intermediate plate surface, and said second back plate surface extending radially in coplanar alignment with one another along a second radial axis perpendicular to said rotation axis.

11. The hydrokinetic torque coupling device as defined in claim 10, wherein said first drive plate surface is coplanarly alignable with said first driven plate surface, said first intermediate plate surface, and said first back plate surface along the first radial axis, and wherein said second drive plate surface is simultaneously coplanarly alignable with said second driven plate surface, said second intermediate plate surface, and said second back plate surface along the second radial axis.

12. The hydrokinetic torque coupling device as defined in claim 11, wherein said first, second, third, and fourth thicknesses are the same.

13. The hydrokinetic torque coupling device as defined in claim 12, wherein said drive plate, said driven plate, said intermediate plate and said back plate are made of the same material.

14. The hydrokinetic torque coupling device as defined in claim 10, wherein said drive plate is axially moveable relative to said driven plate.

15. The hydrokinetic torque coupling device as defined in claim 10, further comprising a centrifugal pendulum oscillator mounted to said back plate coaxially with said rotation axis and aligned with said driven plate, said intermediate plate and said back plate along said radial axis.

16. The hydrokinetic torque coupling device as defined in claim 10, further comprising a second damper retainer plate non-moveably secured to said back plate opposite to said first damper retainer plate and coaxially with said rotation axis, said second damper retainer plate operatively connected to said elastic members.

17. The hydrokinetic torque coupling device as defined in claim 10, wherein both said first damper retainer plate and said turbine hub are fixed to said turbine wheel of said torque converter.

18. The hydrokinetic torque coupling device as defined in claim 10, wherein said elastic members are disposed in series relative to each other.

19. A method for manufacturing a torsional vibration damper for a hydrokinetic torque coupling device, said method comprising the steps of:
   providing a blank sheet in the form of a flat plate having axially opposite planar first and second surfaces and a uniform thickness;
   cutting said blank sheet so as to form a driven plate, an intermediate plate and a back plate;
   providing a plurality of elastic members;
   mounting said intermediate plate rotatably about said driven plate coaxially with an rotation axis of said torsional vibration damper;
   mounting said back plate rotatably mounted about said intermediate plate coaxially with said rotation axis, said first surfaces of said driven plate, said intermediate plate, and said back plate extending radially in coplanar alignment with one another along a first radial axis perpendicular to the rotation axis, and said second surfaces of said driven plate, said intermediate late, and said back plate extending radially in coplanar alignment with one another along a second radial axis perpendicular to the rotation axis; and
   mounting said plurality of said elastic members circumferentially between said driven plate and said intermediate plate.

20. The method as defined in claim 19, further comprising the step of mounting a plurality of pairs of axially opposed pendulum masses on axially opposite surfaces of said back plate.

21. The method as defined in claim 20, further comprising:
   cutting the blank sheet so as to form a drive plate; and
   mounting the drive plate rotatable about the rotation axis,
   wherein the driven plate is non-rotatably coupled to the drive plate and mounted about the drive plate coaxially with the rotation axis, and
   wherein the first surface of the drive plate is coplanarly alignable with the first surfaces of the driven plate, the intermediate plate, and the back plate along the first radial axis, and wherein the second surface of the drive plate is simultaneously coplanarly alignable with the second surfaces of the driven plate, the intermediate plate, and the back plate along the second radial axis.

22. The torsional vibration damper as defined in claim 6, further comprising a centrifugal pendulum oscillator mounted to said back plate coaxially with said rotation axis.

23. The hydrokinetic torque coupling device as defined in claim 12, further comprising a centrifugal pendulum oscillator mounted to said back plate coaxially with said rotation axis.

* * * * *